US012632348B2

(12) United States Patent
Uretzky et al.

(10) Patent No.: US 12,632,348 B2
(45) Date of Patent: May 19, 2026

(54) QUERY RESPONSE BASED ON A JOURNAL DATABASE AND A BACKUP DATABASE

(71) Applicant: HEWLETT PACKARD ENTERPRISE DEVELOPMENT LP, Spring, TX (US)

(72) Inventors: Omer Uretzky, Herzliya (IL); Gil Barash, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/818,814

(22) Filed: Aug. 29, 2024

(65) Prior Publication Data

US 2026/0064544 A1     Mar. 5, 2026

(51) Int. Cl.
| | |
|---|---|
| *G06F 11/10* | (2006.01) |
| *G06F 11/1446* | (2026.01) |
| *G06F 16/18* | (2019.01) |
| *G06F 16/27* | (2019.01) |

(52) U.S. Cl.
CPC ...... *G06F 11/1469* (2013.01); *G06F 16/1815* (2019.01); *G06F 16/27* (2019.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 8,266,147 | B2 * | 9/2012 | Slezak | G06F 16/285 |
| | | | | 707/769 |
| 10,496,496 | B2 | 12/2019 | Slater et al. | |
| 10,732,881 | B1 | 8/2020 | Mayo et al. | |
| 10,776,210 | B2 | 9/2020 | Slater et al. | |
| 11,436,092 | B2 | 9/2022 | Slater et al. | |
| 11,836,053 | B2 | 12/2023 | Falkinder et al. | |
| 2017/0293531 | A1 | 10/2017 | Watkins et al. | |
| 2020/0167238 | A1 | 5/2020 | Killamsetti et al. | |
| 2022/0027578 | A1 * | 1/2022 | Chorakhalikar | G06F 16/345 |
| 2022/0043836 | A1 * | 2/2022 | Upadhyay | G06F 16/285 |

OTHER PUBLICATIONS

Cloudflare, Inc., "What is a vector database?," accessed Aug. 7, 2024, <https://www.cloudflare.com/learning/ai/what-is-vector-database/>.; 7 pages.

(Continued)

*Primary Examiner* — Jau Shya Meng
(74) *Attorney, Agent, or Firm* — Trop, Pruner & Hu, P.C.

(57) ABSTRACT

A a system may replicate a write event to a journal database, the write event involving a change of a source database including data points arranged in a multidimensional space. The replication of the write event may add a journal data point to the journal database. The journal data point may include write data of the write event and metadata indicating a write operation associated with the write data. Based on receipt of a recovery query associated with recovering data of the source database, the system may obtain, according to a filter in the recovery query, a first result from the journal database and a second result from the backup database. The system may merge the first result and the second result to produce a recovery result in response to the recovery query.

20 Claims, 4 Drawing Sheets

500 —

( Process )

502 —

Replicate a write event to a journal vector database, the write event involving a change of a source vector database including vectors arranged in a multidimensional space, where a location of a vector in the multidimensional space is based on values of attributes contained in the vector, where the replicating of the write event adds a journal entry to the journal vector database, the journal entry including write data of the write event and metadata indicating a write operation associated with the write data, and where one or more journal entries from the journal vector database are to be replayed to a backup vector database that stores copies of the vectors of the source vector database

504 —

Based on receipt of a recovery query associated with recovering data of the source vector database, obtain, according to a filter in the recovery query, a first result from the journal vector database and a second result from the backup vector database, where the first result includes a first journal entry from the journal vector database, and the second result includes a copy of a vector from the backup vector database

506 —

Merge the first result and the second result to produce a recovered vector database as a response to the recovery query, where the merging of the first result and the second result includes applying a write operation specified by metadata of the first journal entry

(56) References Cited

OTHER PUBLICATIONS

Zilliz Blog, Safeguard Data Integrity: Backup and Recovery in Vector Databases, Mar. 14, 2024 (8 pages).

Wikipedia, Neural network (machine learning) downloaded Aug. 23, 2024 (42 pages).

Wikipedia, Random forest downloaded Aug. 24, 2024 (13 pages).

Ben Lutkevich, "database replication," Dec. 29, 2022, TechTarget. com, <https://www.techtarget.com/searchdatamanagement/definition/database-replication>, pp. 1-4.

Wcurtispreston, "Snapshot 101: Copy-on-write vs Redirect-on-write," Apr. 1, 2016, StorageSwiss.com, <https://storageswiss.com/2016/04/01/snapshot-101-copy-on-write-vs-redirect-on-write/>, pp. 1-5.

* cited by examiner

500

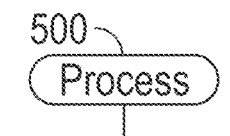

502

Replicate a write event to a journal vector database, the write event involving a change of a source vector database including vectors arranged in a multidimensional space, where a location of a vector in the multidimensional space is based on values of attributes contained in the vector, where the replicating of the write event adds a journal entry to the journal vector database, the journal entry including write data of the write event and metadata indicating a write operation associated with the write data, and where one or more journal entries from the journal vector database are to be replayed to a backup vector database that stores copies of the vectors of the source vector database

504

Based on receipt of a recovery query associated with recovering data of the source vector database, obtain, according to a filter in the recovery query, a first result from the journal vector database and a second result from the backup vector database, where the first result includes a first journal entry from the journal vector database, and the second result includes a copy of a vector from the backup vector database

506

Merge the first result and the second result to produce a recovered vector database as a response to the recovery query, where the merging of the first result and the second result includes applying a write operation specified by metadata of the first journal entry

FIG. 5

QUERY RESPONSE BASED ON A JOURNAL DATABASE AND A BACKUP DATABASE

BACKGROUND

Data stored in databases can be accessed by submitting queries to the databases. Various different database technologies exist, including relational databases, vector databases, graph databases, or other types of databases.

BRIEF DESCRIPTION OF THE DRAWINGS

Some implementations of the present disclosure are described with respect to the following figures.

FIG. 5 is a flow diagram of a process according to some examples.

Figure 1:
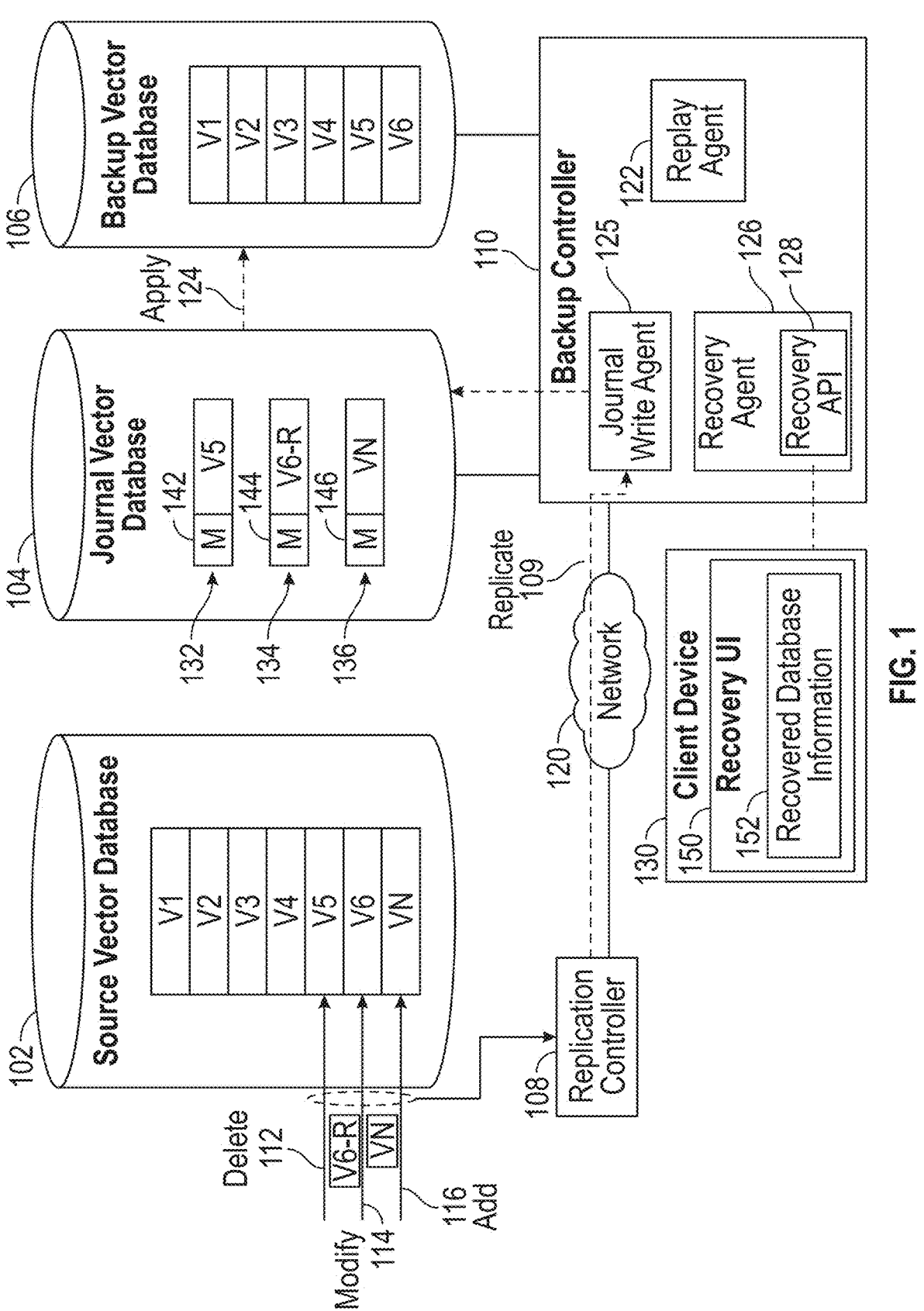
FIG. 1 is a block diagram of an arrangement including a source vector database, a journal vector database, a backup vector database, a replication controller, and a backup controller, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Certain types of databases allow for a query to seek data points contained in the databases that are similar to one or more data points specified by the query. An example of such a database is a vector database, which organizes data as vectors in a multidimensional space. A vector in the vector database represents a respective object. In some cases, the multidimensional space can include a large quantity of dimensions. A vector includes attributes that correspond to these dimensions. Each vector is positioned at a location in the multidimensional space based on values of the attributes in the vector. Vectors that are closer to one another in the multidimensional space represent more similar objects than vectors that are farther apart in the multidimensional space.

To protect the integrity of data in a vector database, data replication techniques can be employed. In some cases, write events that include write data for changing the vector database ("source vector database") can be replicated to a journal (also referred to as a log). At some later time, the write events replicated in the journal can be applied (also referred to as "replayed") to a backup vector database, which contains copies of the vectors in the source vector database. Replaying the write events in the journal results in an update of the backup vector database.

To recover data in case of data corruption or loss in the source vector database, some recovery techniques first apply (replay) all write events in the journal to the backup vector database before a recovery operation is performed to recover data from the backup vector database. However, applying the write events in the journal to the backup vector database can take a relatively long period of time, especially if there are a large quantity of entries in the journal. Moreover, once the write events in the journal are applied to the backup vector database, the application may be irreversible so that the backup vector database may not be recoverable to a prior state.

In accordance with some implementations of the present disclosure, when recovering data of a source database that contains data points in a multidimensional space, a recovery query can be submitted by a requester (e.g., a user, a program, or a machine) to view what data is present in a target version of the source database.

The recovery query causes retrieval of content from a journal database and a backup database to produce the target version of the source database. In response to the recovery query, a recovery agent obtains first recovery data from the journal database (where the first recovery data includes journal data points in the journal database that satisfy the recovery query), and second recovery data from the backup database (where the second recovery data includes backup data points in the backup database that satisfy the recovery query). The recovery agent then merges the first recovery data and the second recovery data to produce result recovery data that can be presented to the requester, without having to first apply any existing entries of the journal database to the backup database. The recovery query can seek a subset of the data points in the source database to recover. For example, a number of transactions (performed at different times) may have been performed that include writes of the source database. The recovery query can include a transaction identifier that identifies a transaction, and in response to the recovery query, the recovery agent recovers data points up to the transaction identified by the recovery query.

As used here, a "database" can refer to a repository of data. A "data point" can refer to a collection of attributes set to respective values for representing an object. An "object" can refer to a person, an animal, a thing, a concept, or any other item. An example of a data point in a multidimensional space is a vector of a vector database. In other examples, other types of databases may employ data points arranged in a multidimensional space.

FIG. 1 is a block diagram of an example arrangement that includes a source vector database 102, a journal vector database 104, and a backup vector database 106. Although some examples discussed herein refer to vector databases, it is noted that in other examples, techniques or mechanisms according to some implementations of the present disclosure can be applied to other types of databases that store data points in a multidimensional space.

Although the example of FIG. 1 shows one source vector database 102, in other examples, there may be multiple source vector databases. Similarly, in other examples, there may be multiple backup vector databases and/or multiple journal vector databases. A "source" vector database is a vector database that is to be protected from data loss or corruption by replicating data of the vector database to another storage structure.

A "journal" vector database is a vector database that stores, in respective journal entries of the journal vector database, vectors of the source vector database that are the subject of writes (e.g., deletions, additions, and modifications). A journal entry additionally includes metadata including information of the type of write operation applied with respective to the vector in the journal entry. The journal entries can be applied to a backup vector database. Application of the journal entries to the backup vector database causes an update of the vectors in the backup vector database based on the journal entries to reflect writes that were performed with respect to the source vector database.

A "backup" vector database is a vector database that stores copies of vectors of the source vector database. If the journal vector database is not empty, then the backup vector database is out of date with respect to the source vector database; in other words, at least one vector of the backup vector database is out of date with respect to at least one corresponding vector in the source vector database.

Vector databases are useful in various different applications. For example, vector databases can be used with machine learning for processing and analyzing data with a large quantity of dimensions (attributes). Machine learning using vector databases can be applied in natural language processing, image classification, and text analysis, for example. Other example uses of vector databases include document retrieval, such as retrieval of images, videos, documents, and so forth. Vector databases can also be used in detecting anomalies or for identifying malware.

The example arrangement of FIG. 1 also includes a replication controller 108 and a backup controller 110. Although shown as two separate controllers, it is noted that in other examples, the replication controller 108 and the backup controller 110 can be integrated into one controller. In further examples, functionalities of the replication controller and/or the backup controller 110 may be separated into additional controllers.

As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

The source vector database 102 stores vectors V1-V6. Although a specific number of vectors are shown in FIG. 1, it is noted that in other examples, different number of vectors may be present in any of the source vector database 102, the journal vector database 104, and the backup vector database 106. The backup vector database 106 also includes a copy of each of the vectors V1-V6.

Various write events may be performed with respect to the source vector database 102. FIG. 1 shows example three example write events, including a delete event 112, a modify event 114, and an add event 116. The delete event 112 deletes vector V5, the modify event 114 modifies vector V6 with an updated vector V6-R, and the add event 116 adds a new vector VN to the source vector database 102.

The replication controller 108 replicates (at 109), over a network 120, the write events, including the delete event 112, the modify event 114, and the add event 116, to the journal vector database 104. The replication is performed through a journal write agent 125 in the backup controller 110. A write event can include an input/output (I/O) operation for writing data to the source vector database 102. The I/O operations of write events can be part of one or more transactions. A "transaction" can refer to any collection of one or more I/O operations. A requestor (e.g., a human, a program, or a machine) that accesses the source vector database 102 can indicate the start of a transaction and the end of the transaction. Thus, a transaction has a start point and an end point. Each transaction is identified by a transaction identifier, which can be a numerical or alphanumerical value for distinguishing one transaction from another transaction. Some transactions are applied in a sequence, while other transactions can be applied in parallel. In some examples, transaction identifiers are incrementing indexes that identify successive transactions as they are started.

The replication controller 108 replicates I/O operations of transactions to the journal vector database 104. A replicated I/O operation (of a write event) is added as a journal entry in the journal vector database 104. In the example of FIG. 1, three journal entries 132, 134, and 136 have been added to the journal vector database 104 due to the replication (at 109) of the delete event 112, the modify event 114, and the add event 116, respectively. Each journal entry includes a vector that is the subject of a write event, and metadata associated with the corresponding I/O operation. Thus, in the example of FIG. 1, the journal entry 132 contains the vector V5 and metadata 142, which can include information of the type of I/O operation (in this case a delete I/O operation) and a transaction identifier to identify the transaction that the I/O operation is part of.

The journal entry 134 includes the updated vector V6-R, and metadata 144 including information specifying a modify I/O operation and a transaction identifier of the transaction that the modify I/O operation is part of. The journal entry 136 contains the new vector VN and metadata 146 including information specifying an add I/O operation and a transaction identifier identifying the transaction that the add I/O operation is part of.

Note that, prior to application of the journal entries to the backup vector database 106, write events represented by the journal entries in the journal vector database 104 are not reflected in the backup vector database 106.

The backup controller 110 includes the journal write agent 125 to write journal entries to the journal vector database 104, in response to replicate requests from the replication controller 108. A replicate request can include a request to replicate one or more write events to the journal vector database 104. The journal write agent 125 generates write commands to write respective journal entries to the journal vector database 104. An "agent" in a controller can refer to a portion of the hardware processing circuitry of the controller, or to machine-readable instructions executed by the controller.

The backup controller 110 includes a replay agent 122 that is to apply (at 124) the journal entries in the journal vector database 104 to the backup vector database 106. The replay agent 122 can apply (at 124) the journal entries to the backup vector database 106 in response to a user request, or in response to another trigger (e.g., a periodic trigger associated with periodically applying journal entries to the backup vector database 106, or any other type of trigger). In some examples, for journal entries associated with a given transaction, the journal entries are applied to the backup vector database 106 in the same order as the journal entries were added to the journal vector database 104. After applying the journal entries in the journal vector database 104 to the backup vector database 106, the journal entries can be removed from the journal vector database 104.

The backup controller 110 further includes a recovery agent 126 that can recover vectors based on content of the journal vector database 104 and the backup vector database 106. In some examples, the recovery agent 126 includes a recovery application programming interface (API) 128 that is accessible to client devices, such as a client device 130. The recovery API 128 includes various routines that can be invoked by the client device 130 to perform a database recovery operation. For example, in response to a request of a user or another entity at the client device 130, the client device 130 can invoke a routine of the recovery API 128 to initiate the database recovery operation. The invoked routine of the recovery API 128 can send a recovery query to the journal vector database 104 and the backup vector database 106 to retrieve entries that satisfy the recovery query.

A "recovery query" refers to a database query that is submitted to retrieve data for recovering to a target version of the source vector database 102. The recovery query can include a filter specifying one or more criteria (or predicates). Any entries of the journal vector database 104 and the backup vector database 106 that satisfy the filter are retrieved from the journal vector database 104 and the backup vector database 106 to produce a recovery result, which includes the target version of the source vector database 102. Entries of the journal vector database 104 that satisfy the filter of the recovery query can include zero or more journal entries. Entries of the backup vector database 106 that satisfy the filter of the recovery query can include zero or more copies of vectors.

In other examples, instead of the recovery API 128, the recovery agent 126 can include another type of interface accessible to client devices for initiating recovery queries.

In some examples, the client device 130 includes a recovery user interface (UI) 150, such as a graphical user interface (GUI), a command line interface, or another type of interface. A user of the client device 130 can input requests into the recovery UI 150 to initiate a database recovery operation. In response to the requests input into the recovery UI 150, the client device 130 invokes a routine of the recovery API 128 to perform the database recovery operation.

Once the recovery agent 126 has generated a recovered vector database (which is the target version of the source vector database 102 sought by the recovery query), the recovery agent 126 sends to the client device 130 recovered database information 152 that can be presented in the recovery UI 150. The recovered database information 152 can include a name (or another identifier) of the recovered vector database. The user of the client device 130 can then submit database queries with respect to the recovered vector database to view content of the recovered vector database (as presented in the recovery UI 150). In this manner, the user can determine whether the recovered vector database is in fact an appropriate version of the source vector database 102 to use for recovering the source vector database 102.

Figure 2:
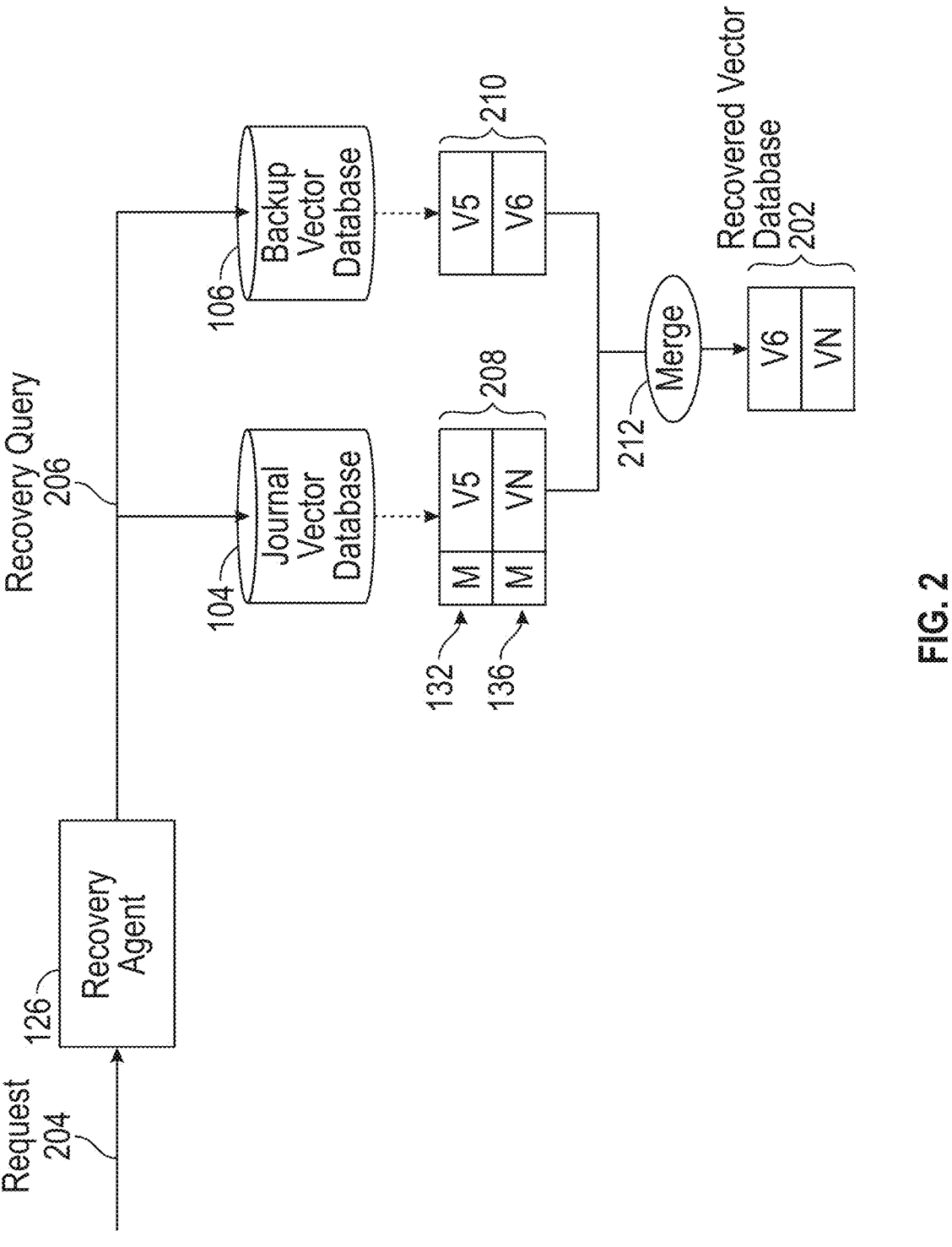
FIG. 2 is a block diagram of an example of creating a recovered vector database using the journal vector database and the backup vector database, according to some examples.

FIG. 2 is a block diagram of an example of obtaining a recovered vector database 202 using the journal vector database 104 and the backup vector database 106. The recovery agent 126 receives a request 204 to initiate a database recovery operation, such as from the client device 130 of FIG. 1. In response to the request 204, the recovery agent 126 issues a recovery query 206 to the journal vector database 104 and the backup vector database 106. In an example, the recovery query 206 can include a filter seeking vectors of transactions up to a particular transaction. In other words, vectors that satisfy the filter are those in the particular transaction and any transactions prior to the particular transaction.

In the example of FIG. 1, it assumed that vectors V5 and V6 were originally written to the source vector database 102 in transaction TR1 and that the delete event 112 (which deletes V5) and the add event 116 (which adds VN) occurred in transaction TR2 after TR1. Further, the vectors V1-V4 are added to the source vector database 102 in one or more transactions after transaction TR2, and the modify event 114 is performed in a transaction after transaction TR2.

The filter in the recovery query 206 can seek vectors of transactions up to TR2, which in this example include transactions TR1 and TR2. In such an example, in response to the recovery query 206, the journal vector database 104 outputs the journal entries 132 and 136 that satisfy the filter in the recovery query 206 as part of a first result 208 obtained from the journal vector database 104. In response to the recovery query 206, the backup vector database 106 outputs the copies of vectors V5 and V6 that satisfy the filter in the recovery query 206 as part of a second result 210.

The recovery agent 126 then merges (at 212) the first result 208 and the second result 210. As part of the merging, the recovery agent 126 determines, based on the metadata in the journal entries 132 and 136 of the first result 208, the types of I/O operations to apply. In the depicted example, the metadata of the journal entry 132 specifies that vector V5 is deleted, and the metadata of the journal entry 134 specifies that vector VN is added. The recovered vector database 202 includes vector V6 and vector VN; vector V5 is omitted from the recovered vector database 202 because vector V5 has been deleted.

The recovery agent 126 then sends recovered database information (e.g., 152 in FIG. 1) referring to the recovered vector database 202 to the client device 130. A user (or another entity) at the client device 130 can perform database queries with respect to the recovered vector database 202.

Figure 3:
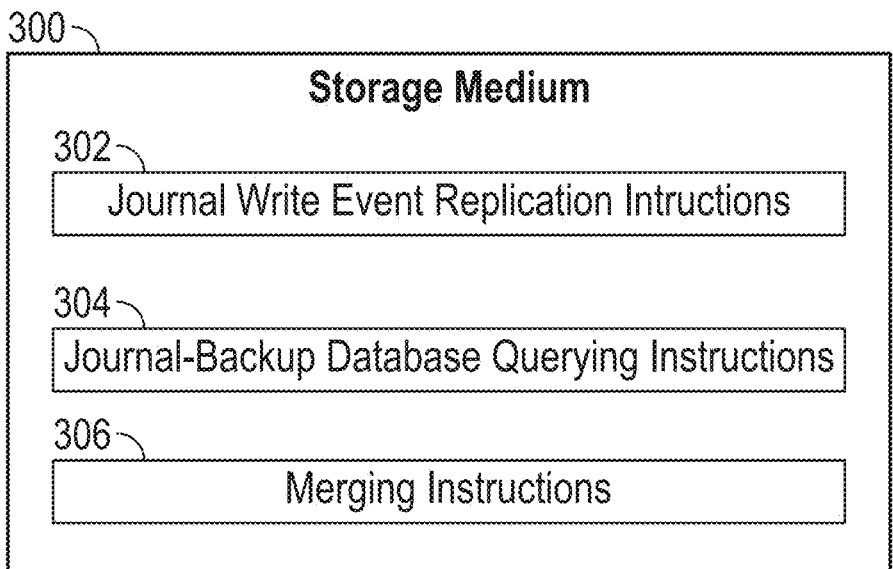
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can be implemented with one or more computers, and may include the replication controller 108 and the backup controller 110 of FIG. 1, for example.

The machine-readable instructions include journal write event replication instructions 302 to replicate a write event to a journal database, such as the journal vector database 104 or another type of journal database. The write event involves a change (add, modify, or delete) of a source database (e.g., the source vector database 102 of FIG. 1 or another type of source database), which contains data points arranged in a multidimensional space. A location of a data point in the multidimensional space is based on values of attributes contained in the data point. The replication of the write event adds a journal data point to the journal database. The journal data point (e.g., a journal entry 132, 134, or 136 of FIG. 1) includes write data of the write event and metadata indicating a write operation associated with the write data. The metadata of the journal data point can indicate a type of write operation selected from among a delete operation, an add operation, and a modify operation. One or more journal data points from the journal database are to be replayed to a backup database (e.g., the backup vector database 106 of FIG. 1 or another type of backup database) that stores copies of the data points of the source database.

The machine-readable instructions include journal-backup database querying instructions 304 to, based on receipt of a recovery query associated with recovering data of the source database, obtain, according to a filter in the recovery query, a first result from the journal database and a second result from the backup database. The first result can include zero or more journal data points from the journal database, and the second result can include zero or more copies of data points from backup database.

The machine-readable instructions include merging instructions 306 to merge the first result and the second result to produce a recovery result in response to the recovery query. The recovery result can include a recovered database that is accessible using one or more database queries.

In some examples, the machine-readable instructions can replay the one or more journal data points in the journal database to the backup database by applying one or more write operations (e.g., add operations, modify operations, or delete operations) indicated by the one or more journal data points to the backup database.

In some examples, the filter in the recovery query indicates a subset of the data points in the source database to recover, such as data points in transaction(s) up to a particular transaction identified by a transaction identifier in the filter of the recovery query.

In some examples, if the filter in the recovery query includes a transaction identifier that identifies a first transaction, the first result obtained from the journal database includes journal data points associated with the first transaction (and any preceding transaction(s) before the first transaction), and the second result obtained from the backup database includes copies of data points associated with the first transaction (and any preceding transaction(s) before the first transaction).

In some examples, in response to the recovery query, the machine-readable instructions can obtain, from the journal database, a first journal data point associated with a delete event that deletes a first data point from the source database, and obtain, from the backup database, a copy of the first data point. As part of the merging, the machine-readable instructions can exclude the copy of the first data point from the recovery result based on the first journal data point.

In some examples, in response to the recovery query, the machine-readable instructions can obtain, from the journal database, a first journal data point associated with an add event that adds a new data point to the source database, and obtain, from the backup database, first copies of data points of the source database. The first copies of data points of the source database do not include the new data point. As part of the merging, the machine-readable instructions can add the new data point to the recovery result based on the first journal data point.

In some examples, in response to the recovery query, the machine-readable instructions can obtain, from the journal database, a first journal data point associated with a modify event that modifies a first data point to the source database, and obtain, from the backup database, copies of data points of the source database, the obtained copies of data points of the source database including the first data point. As part of the merging, the machine-readable instructions can modify the first data point according to first journal data point and include the modified first data point in the recovered database.

In some examples, the recovery query is generated based on access of an interface by a client device. An example of the interface is the recovery API 128 of FIG. 1.

In some examples, the recovery result includes a recovered database, and the machine-readable instructions can present, at a UI of the client device, recovered database information referring to the recovered database. The machine-readable instructions can also receive, based on an input at the UI, a database query that seeks data from the recovered database.

In some examples, the recovery result is generated without first replaying journal data points in the journal database to the backup database.

Figure 4:
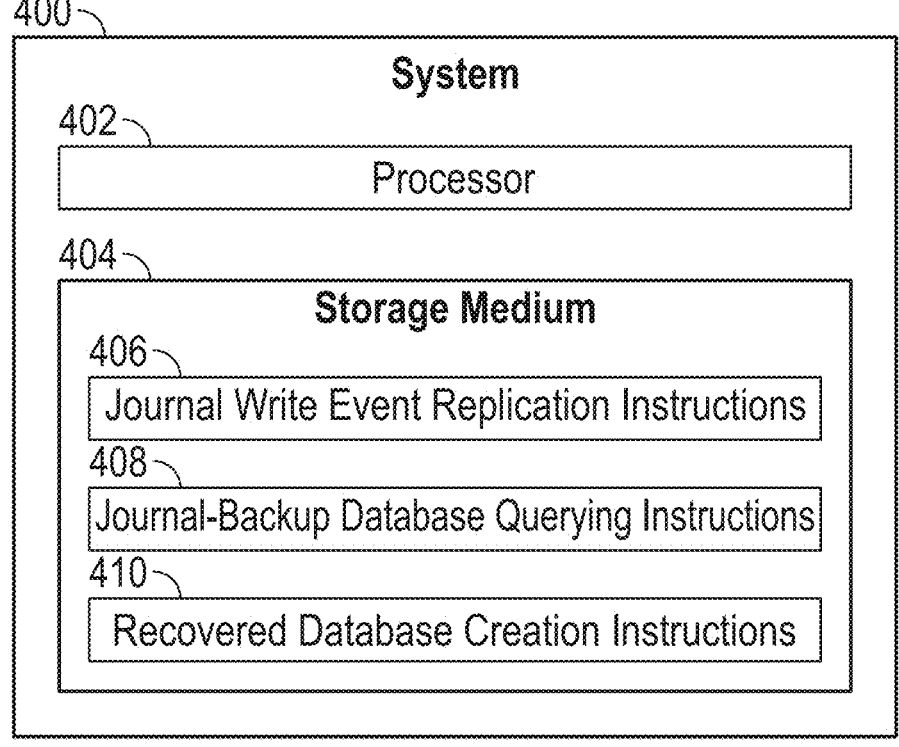
FIG. 4 is a block diagram of a system according to some examples.

FIG. 4 is a block diagram of a system 400, which can be implemented with one or more computers. The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium 404 include journal write event replication instructions 406 to replicate a write event to a journal database, the write event involving a change of a source database including data points arranged in a multidimensional space. The replication of the write event adds a journal data point to the journal database, and the journal data point includes write data of the write event and metadata indicating a write operation associated with the write data. One or more journal data points from the journal database are to be replayed to a backup database that stores copies of the data points of the source database.

The machine-readable instructions in the storage medium 404 include journal-backup database querying instructions 408 to, based on receipt of a recovery query associated with recovering data of the source database, obtain, according to a filter in the recovery query, a first result from the journal database and a second result from the backup database.

The machine-readable instructions in the storage medium 404 include recovered database creation instructions 410 to merge the first result and the second result to produce a recovered database in response to the recovery query. The merging of the first result and the second result includes applying a write operation specified by metadata of a journal data point in the journal database.

In some examples, the first result includes less than all of journal data points in the journal database.

In some examples, the recovery query is received in response to a request at a client device, and the machine-readable instructions can provide, to the client device, recovered database information referring to the recovered database. The machine-readable instructions can receive, from the client device, a database query to extract data from the recovered database.

FIG. 5 is a block diagram of a process 500 according to some examples, which may be performed by the replication controller 108 and the backup controller 110 of FIG. 1, for example.

The process 500 includes replicating (at 502) a write event to a journal vector database, the write event involving a change of a source vector database including vectors arranged in a multidimensional space, where a location of a vector in the multidimensional space is based on values of attributes contained in the vector, where the replicating of the write event adds a journal entry to the journal vector database, the journal entry including write data of the write event and metadata indicating a write operation associated with the write data, and where one or more journal entries from the journal vector database are to be replayed to a backup vector database that stores copies of the vectors of the source vector database.

Based on receipt of a recovery query associated with recovering data of the source vector database, the process 500 includes obtaining (at 504), according to a filter in the recovery query, a first result from the journal vector database and a second result from the backup vector database, where the first result includes a first journal entry from the journal vector database, and the second result includes a copy of a vector from the backup vector database.

The process 500 includes merging (at 506) the first result and the second result to produce a recovered vector database as a response to the recovery query, where the merging of the first result and the second result includes applying a write operation specified by metadata of the first journal entry.

Examples of a client device (e.g., 130 in FIG. 1) can include any or some combination of the following: a desktop computer, a notebook computer, a smartphone, or any other type of electronic device.

A "network" (e.g., 120 in FIG. 1) can refer to a local area network (LAN), a wide area network (WAN), the Internet, a storage area network (SAN), or any other type of communication fabric.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM), and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

replicate a write event to a journal database, the write event involving a change of a source database comprising data points arranged in a multidimensional space, wherein a location of a data point in the multidimensional space is based on values of attributes contained in the data point, wherein the replicating of the write event adds a journal data point to the journal database, the journal data point comprising write data of the write event and metadata indicating a write operation associated with the write data, and wherein one or more journal data points from the journal database are to be replayed to a backup database that stores copies of the data points of the source database;

based on receipt of a recovery query associated with recovering data of the source database, obtain, according to a filter in the recovery query, a first result from the journal database and a second result from the backup database; and merge the first result and the second result to produce a recovery result in response to the recovery query.

2. The non-transitory machine-readable storage medium of claim 1, wherein the recovery result comprises a recovered database that is accessible using one or more database queries.

3. The non-transitory machine-readable storage medium of claim 1, wherein the source database comprises a source vector database, and the data points of the source vector database comprise vectors, wherein the journal database comprises a journal vector database, and wherein the backup database comprises a backup vector database.

4. The non-transitory machine-readable storage medium of claim 1, wherein the instructions upon execution cause the system to:

replay the one or more journal data points to the backup database by applying one or more write operations indicated by the one or more journal data points to the backup database.

5. The non-transitory machine-readable storage medium of claim 1, wherein the filter in the recovery query indicates a subset of the data points in the source database to recover.

6. The non-transitory machine-readable storage medium of claim 5, wherein the filter in the recovery query comprises a transaction identifier that identifies a first transaction, wherein the first result obtained from the journal database comprises journal data points associated with the first transaction, and the second result obtained from the backup database comprises copies of data points associated with the first transaction.

7. The non-transitory machine-readable storage medium of claim 6, wherein the first result obtained from the journal database further comprises journal data points associated with one or more transactions preceding the first transaction, and the second result obtained from the backup database further comprises data points associated with the one or more transactions preceding the first transaction.

8. The non-transitory machine-readable storage medium of claim 1, wherein the instructions upon execution cause the system to:

in response to the recovery query, obtain, from the journal database, a first journal data point associated with a delete event that deletes a first data point from the source database, and obtain, from the backup database, a copy of the first data point; and as part of the merging, exclude the copy of the first data point from the recovery result based on the first journal data point.

9. The non-transitory machine-readable storage medium of claim 1, wherein the instructions upon execution cause the system to:

in response to the recovery query, obtain, from the journal database, a first journal data point associated with an add event that adds a new data point to the source database, and obtain, from the backup database, copies of data points of the source database, the obtained copies of data points of the source database not including the new data point; and as part of the merging, add the new data point to the recovery result based on the first journal data point.

10. The non-transitory machine-readable storage medium of claim 1, wherein the recovery query is generated based on access of an interface by a client device.

11. The non-transitory machine-readable storage medium of claim 10, wherein the recovery result comprises a recovered database, and the instructions upon execution upon cause the system to:

present, at a user interface (UI) of the client device, recovered database information referring to the recovered database; and receive, based on an input at the UI, a database query that seeks data from the recovered database.

12. The non-transitory machine-readable storage medium of claim 1, wherein the recovery result is generated without first replaying journal data points in the journal database to the backup database.

13. A system comprising:

a processor; and a non-transitory storage medium storing instructions executable on the processor to:

replicate a write event to a journal database, the write event involving a change of a source database comprising data points arranged in a multidimensional space, wherein a location of a data point in the multidimensional space is based on values of attributes contained in the data point, wherein the replicating of the write event adds a journal data point to the journal database, the journal data point comprising write data of the write event and metadata indicating a write operation associated with the write data, and wherein one or more journal data points from the journal database are to be replayed to a backup database that stores copies of the data points of the source database;

based on receipt of a recovery query associated with recovering data of the source database, obtain, according to a filter in the recovery query, a first result from the journal database and a second result from the backup database; and merge the first result and the second result to produce a recovered database in response to the recovery query, wherein the merging of the first result and the second result comprises applying a write operation specified by metadata of a journal data point in the journal database.

14. The system of claim 13, wherein the first result comprises less than all of journal data points in the journal database.

15. The system of claim 13, wherein the recovery query is received in response to a request at a client device, and the instructions are executable on the processor to:

provide, to the client device, recovered database information referring to the recovered database; and receive, from the client device, a database query to extract data from the recovered database.

16. The system of claim 13, wherein the source database comprises a source vector database, and the data points of the source vector database comprise vectors, wherein the journal database comprises a journal vector database, and wherein the backup database comprises a backup vector database.

17. The system of claim 13, wherein the instructions are executable on the processor to:

in response to the recovery query, obtain, from the journal database, a first journal data point associated with a delete event that deletes a first data point from the source database, and obtain, from the backup database, a copy of the first data point; and as part of the merging, exclude the copy of the first data point from the recovered database based on the first journal data point.

18. The system of claim 13, wherein the instructions are executable on the processor to:

in response to the recovery query, obtain, from the journal database, a first journal data point associated with a modify event that modifies a first data point to the source database, and obtain, from the backup database, copies of data points of the source database, the obtained copies of data points of the source database including the first data point; and as part of the merging, modify the first data point according to first journal data point and include the modified first data point in the recovered database.

19. A method comprising:

replicating, by a system comprising a hardware processor, a write event to a journal vector database, the write event involving a change of a source vector database comprising vectors arranged in a multidimensional space, wherein a location of a vector in the multidimensional space is based on values of attributes contained in the vector, wherein the replicating of the write event adds a journal entry to the journal vector database, the journal entry comprising write data of the write event and metadata indicating a write operation associated with the write data, and wherein one or more journal entries from the journal vector database are to be replayed to a backup vector database that stores copies of the vectors of the source vector database;

based on receipt of a recovery query associated with recovering data of the source vector database, obtaining, by the system according to a filter in the recovery query, a first result from the journal vector database and a second result from the backup vector database, wherein the first result comprises a first journal entry from the journal vector database, and the second result comprises a copy of a vector from the backup vector database; and merging, by the system, the first result and the second result to produce a recovered vector database as a response to the recovery query, wherein the merging of the first result and the second result comprises applying a write operation specified by metadata of the first journal entry.

20. The method of claim 19, wherein the first result comprises less than all of journal entries in the journal vector database.

* * * * *